(12) United States Patent
Moser et al.

(10) Patent No.: US 7,044,677 B2
(45) Date of Patent: May 16, 2006

(54) FATIGUE RESISTANT SLOT AND TAB DESIGN

(75) Inventors: Todd E. Moser, Roanoke, IL (US); Timothy A. Vik, Sparland, IL (US); Daniel J. Lingenfelser, Chillicothe, IL (US); Jeffrey P. Nash, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 10/445,667

(22) Filed: May 27, 2003

(65) Prior Publication Data

US 2004/0140341 A1    Jul. 22, 2004

Related U.S. Application Data

(60) Provisional application No. 60/440,888, filed on Jan. 17, 2003.

(51) Int. Cl.
*F16B 5/01* (2006.01)

(52) U.S. Cl. .......................... 403/252; 403/13; 228/135

(58) Field of Classification Search ............. 228/173.6, 228/174, 135, 136; 29/428; 403/13, 252; 219/137 R
See application file for complete search history.

(56) References Cited

U.S. PATENT DOCUMENTS

| | | | |
|---|---|---|---|
| 4,097,716 A | 6/1978 | Beichelt, Jr. et al. | |
| 4,365,736 A * | 12/1982 | Stumm | 228/121 |
| 5,159,175 A | 10/1992 | Loeber | |
| 5,249,818 A * | 10/1993 | Patterson | 280/281.1 |
| 6,131,286 A | 10/2000 | Kelly et al. | |
| 6,135,666 A * | 10/2000 | Kelly et al. | 403/256 |
| 6,241,144 B1 * | 6/2001 | Mandon | 228/135 |

FOREIGN PATENT DOCUMENTS

| | | |
|---|---|---|
| DE | 199 43 220 A1 | 4/2001 |
| WO | WO 00/04295 | 1/2000 |
| WO | WO 01/64368 A | 9/2001 |

* cited by examiner

*Primary Examiner*—Jonathan Johnson
(74) *Attorney, Agent, or Firm*—Liell & McNeil

(57) ABSTRACT

Engineers have found that use of a slot and tab method to assemble a fabrication assembly is limited to fabrication assemblies that will be subjected to relatively low stress. In order to expand the use of the slot and tab method to fabrication assemblies that are subjected to relatively higher stress, the present invention increases the fatigue resistance of a welded slot and tab joint. A fabrication assembly includes a first fabrication element including a perimetric inner surface defining a slot and a second fabrication element including a tab. The tab includes a shoulder that includes a perimetric side surface. The tab is cooperative with the slot to lock the first fabrication element to the second fabrication element. At least one of the perimetric inner surface and the perimetric side surface includes portions that are oriented to one another at an angle different than 0° and 90°. The geometry of at least one of the shoulder of the tab and the perimetric inner surface defining the slot can increase the fatigue resistance of the welded slot and tab joint.

14 Claims, 8 Drawing Sheets

FATIGUE RESISTANT SLOT AND TAB DESIGN

RELATION TO OTHER APPLICATION

This application claims the benefit of provisional application Ser. No. 60/440,888, filed Jan. 17, 2003.

TECHNICAL FIELD

The present invention relates generally to joining two fabrication elements, and more particularly to a fatigue resistant welded joint within a fabrication assembly that includes a tab and slot.

BACKGROUND

The fabrication of various assemblies, such as vehicle or machine frames, generally require a number of fabrication elements to be attached and welded to one another. One method of attaching fabrication elements in the proper orientation to one another during welding is known in the art as the slot and tab method. The slot and tab method, shown in co-owned U.S. Pat. No. 6,135,286, issued to Kelley et al., on Oct. 17, 2000, permits the attachment of fabrication elements to one another without the use of fixtures, or with the use of a reduced amount of fixtures, thereby reducing costs and increasing productivity.

The slot and tab method attaches a second fabrication element including a tab to a first fabrication element including a slot by inserting the tab into the slot so that a breakable portion of the tab protrudes through one side of the slot. The breakable portion of the tab can be rotated to secure the attachment. In order to create a fixed joint between the two fabrication elements, an interface between the two fabrication elements is fillet welded. The breakable portion is then detached from the tab by further rotating the breakable portion. A severed portion of the tab, including a tab shoulder, remains within the slot. In order to, at least partially fill a void within the slot, the slot is plug welded. Generally, the slot and the tab are rectangular and close fitting so that mating the tab and slot automatically aligns the fabrication elements for welding, often without the need for an external fixture.

Although the existing slot and tab design has performed well in many fabricated assemblies, the use of the slot and tab design has been limited to the fabricated assemblies having relatively low stress applications. Engineers have found that the current slot and tab design limits the penetration depth of the fillet weld and the plug weld, thereby creating unfused areas within the fabrication assembly. These unfused areas can create small voids that remain imbedded within the attachment after the fabrication assembly is completed. When the fabrication assembly is subjected to repeated loads, stress can concentrate around the voids, sometimes causing the small voids to become initiation points for fatigue cracks. Further, engineers have found that, due to the abrupt change in stiffness from the fillet weld to the plug weld, the plug weld within the slot can act also act as a stress concentrator. Rather than being distributed through the fabrication assembly, stress can concentrate within the plug weld, especially around the sharp corners of a rectangular plug weld. Again, the stress can lead to fatigue cracks. The fatigue cracks can lead to premature failure of the fabrication assembly.

Referring to FIGS. 1–3, there are shown sectioned side views of a welded joint 9 with a plug weld 14 removed, according to the prior art. In FIGS. 1–3, a second fabrication element 12 including a tab shoulder 11 and a severed neck 20 is oriented perpendicularly to a first fabrication element 10 defining a slot 13. The tab shoulder 11 and the severed neck 20 are positioned within the slot 13. A fillet weld 15 runs along an interface 16 between the first fabrication element 10 and the second fabrication element 12. The plug weld 14 is removed from the slot 13 for illustration purposes, although it should be appreciated that the plug weld 14 is positioned within the slot 13 to form the welded joint 9. The slot 13 and the tab shoulder 11 are rectangular, and the tab shoulder 11 is approximately half the height of the walls of the slot 13.

Referring specifically to FIG. 1, there is shown a first crack plane 17 between the first and the second fabrication elements 10 and 12. The first crack plane 17 is parallel to the fillet weld 15. The first crack plane 17 is caused by an unfused area between the first fabrication element 10 and the second fabrication element 12. The unfused area is caused by a limited penetration of the fillet weld 15. When load is applied to the welded joint 9, the portion of the welded joint 9 in the first crack plane 17 will be subjected to the stress of the load that cannot be distributed through the unfused area, thereby creating small voids within the first crack plane 17. After repeated loads, the small void can eventually propagate outward as fatigue cracks, leading to premature failure of the welded joint 9.

Referring now to FIG. 2, there is shown a second crack plane 18 between the relatively long sides of the rectangular tab shoulder 11 and the slot 13. The second crack plane 18 runs along the relatively long sides of the tab shoulder 11 parallel to the fillet weld 15, and is caused, in part, by the limited penetration of the fillet weld 15. If the fillet weld 15 does not penetrate up to the plug weld 14, there will be an unfused surface between the fillet weld 15 and the plug weld 14 Further, there may be an unfused surface extending into the slot 13. Because the tab shoulder 11 generally extends, at least half way through the slot 13 and is rectangular with relatively sharp corners, the penetration of the weld material between the relatively long sides of the shoulder 11 and the slot is limited, thereby leaving another unfused surface or void. The unfused surfaces have been found to act as a stress concentrator in the second crack plane 18 from which fatigue cracks may form.

Referring to FIG. 3, there is shown a third crack plane 19 between the slot 13 and the relatively short sides of the tab shoulder 11 that run perpendicular to the fillet weld 15. The third crack plane 19 is caused by unfused surfaces between the relatively short sides of the tab shoulder 11 and the slot 13. Again, because of the shape and size of the tab shoulder 11 and the slot 13, there can be limited penetration of the plug weld material between the sides of the tab shoulder 11 and the slot 13. Further, the plug weld 14 may not make contact with a top surface of the tab shoulder 11 from which the severed neck 20 protrudes, thereby leaving a void between the plug weld 14 and the tab shoulder 11. Again, these unfused surfaces, caused by the limited penetration of the plug weld 14, can lead to the formation of the third crack plane 18. The thin voids created by the unfused surfaces can act as initiation point for fatigue cracks.

The present invention is directed at overcoming one or more of the problems set forth above.

SUMMARY OF THE INVENTION

In one aspect of the present invention, a fabrication assembly includes a first fabrication element that includes a perimetric inner surface defining a slot and a second fabrication element that includes a tab. The tab cooperates with the slot to lock the first fabrication element to the second fabrication element. The tab includes a breakable portion, a neck, and a shoulder that has a top surface, a perimetric side surface and a base. At least one of the perimetric inner surface and the perimetric side surface includes portions that are oriented to one another at an angle different than 0° and 90°.

In another aspect of the present invention, a welded joint includes a first fabrication element that includes a perimetric inner surface defining a slot and a second fabrication element that includes a severed tab. The severed tab includes a severed neck and a shoulder that has a top surface, a perimetric side surface and a base. At least one of the perimetric inner surface and the perimetric side surface includes portions that are oriented to one another at an angle different than 0° and 90°. A plug weld, along with at least a portion of the severed neck and the shoulder, are positioned within the slot, and a fillet weld is positioned along an interface between the fabrication element and the second fabrication element.

In yet another aspect of the present invention, two fabrication elements are joined by shaping at least one of a perimetric inner surface defining a slot and perimetric side surface of a tab shoulder to include portions that are oriented to one another at an angle different than 0° and 90°. A fabrication assembly is assembled, at least in part, by inserting a tab included in a second fabrication element into the slot included in a first fabrication element. By rotating a breakable portion of the tab protruding through the slot, the fabrication assembly is locked. An interface between the first fabrication element and the second fabrication element is welded, and the breakable portion of the tab is removed, at least in part, by further rotating the breakable portion of the tab. The slot is also welded.

DETAILED DESCRIPTION

Figure 1:
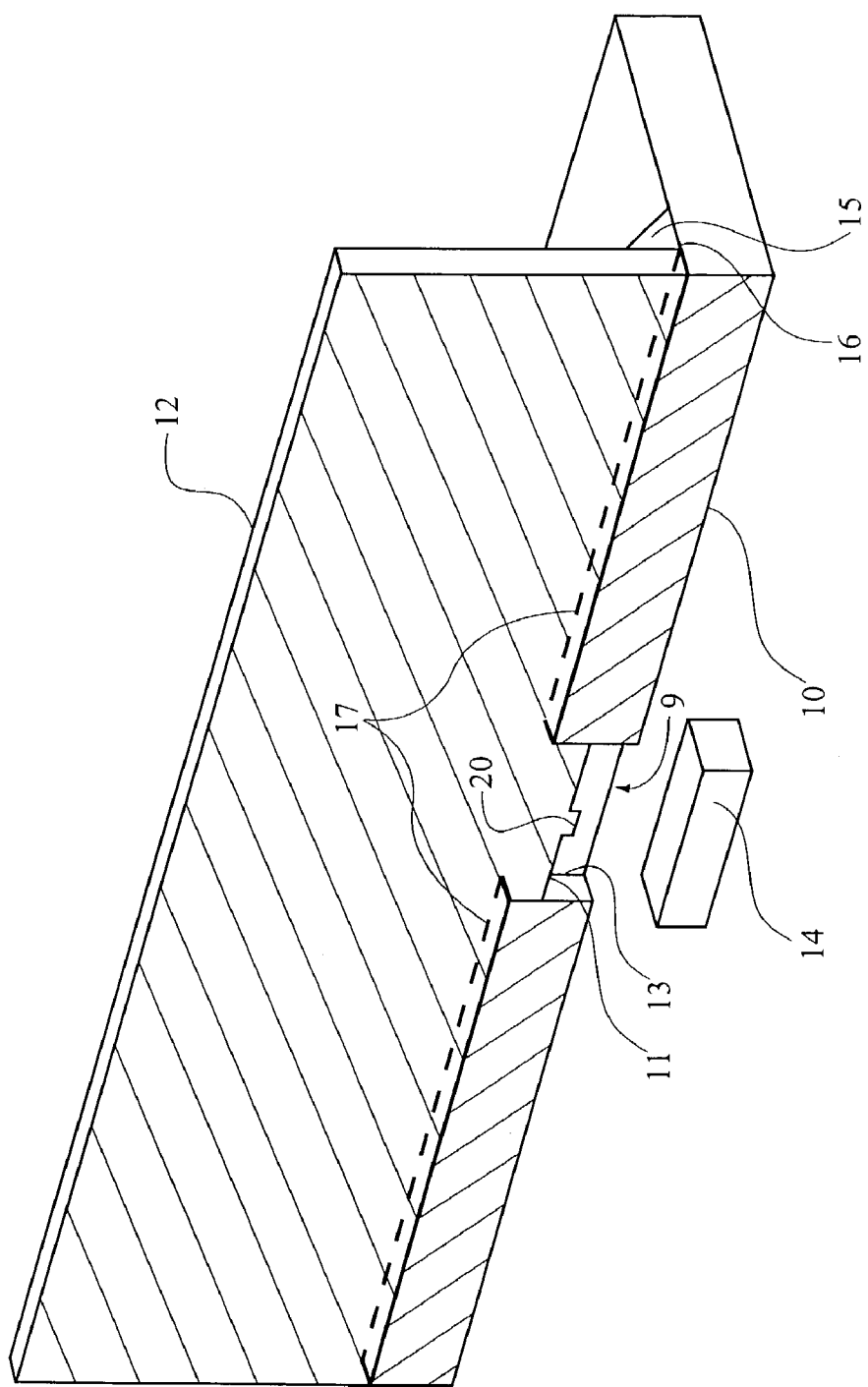
FIGS. 1–3 are sectioned isometric side views of a welded joint with a plug weld removed, according to the prior art.
Figure 2:
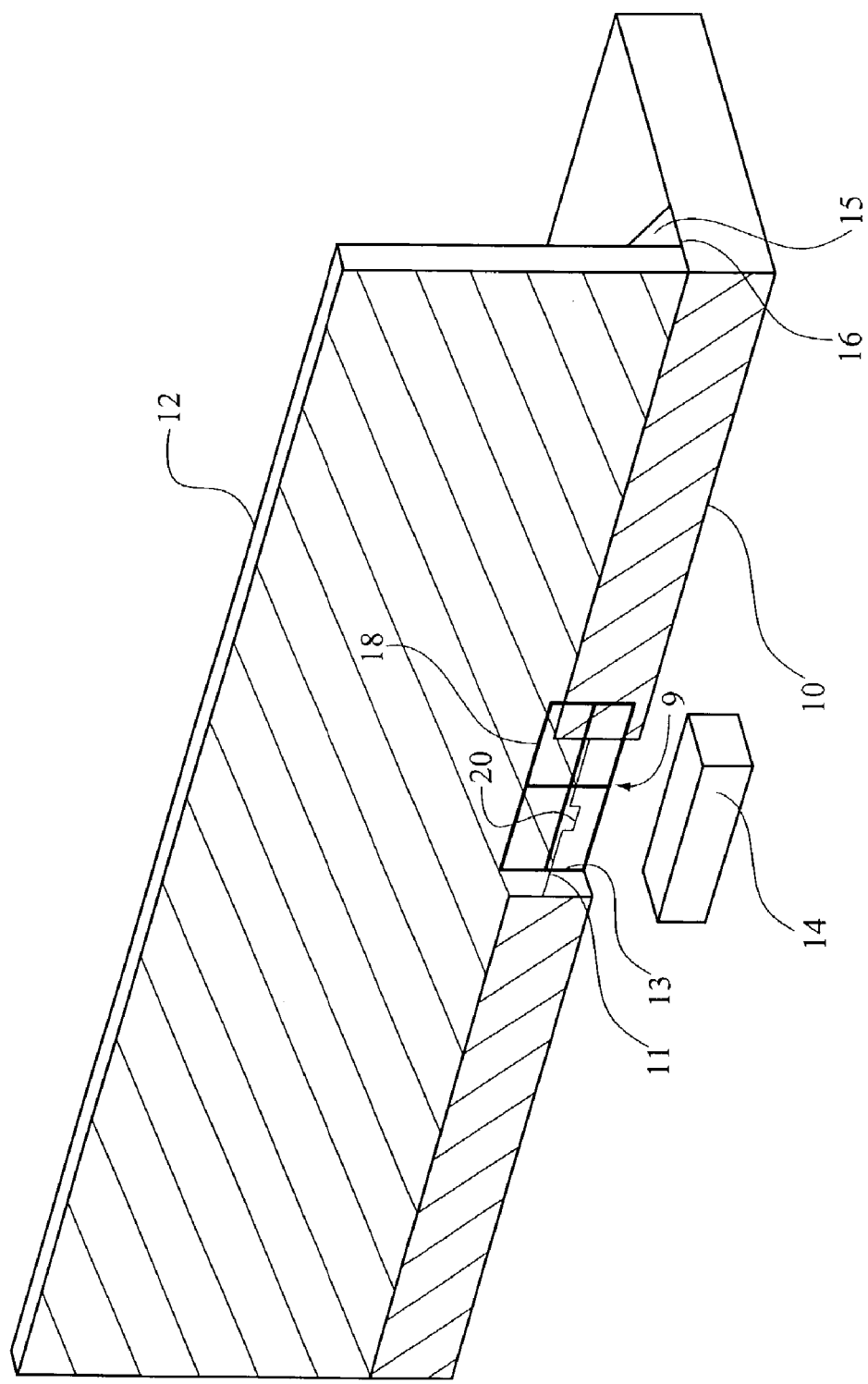
Figure 3:
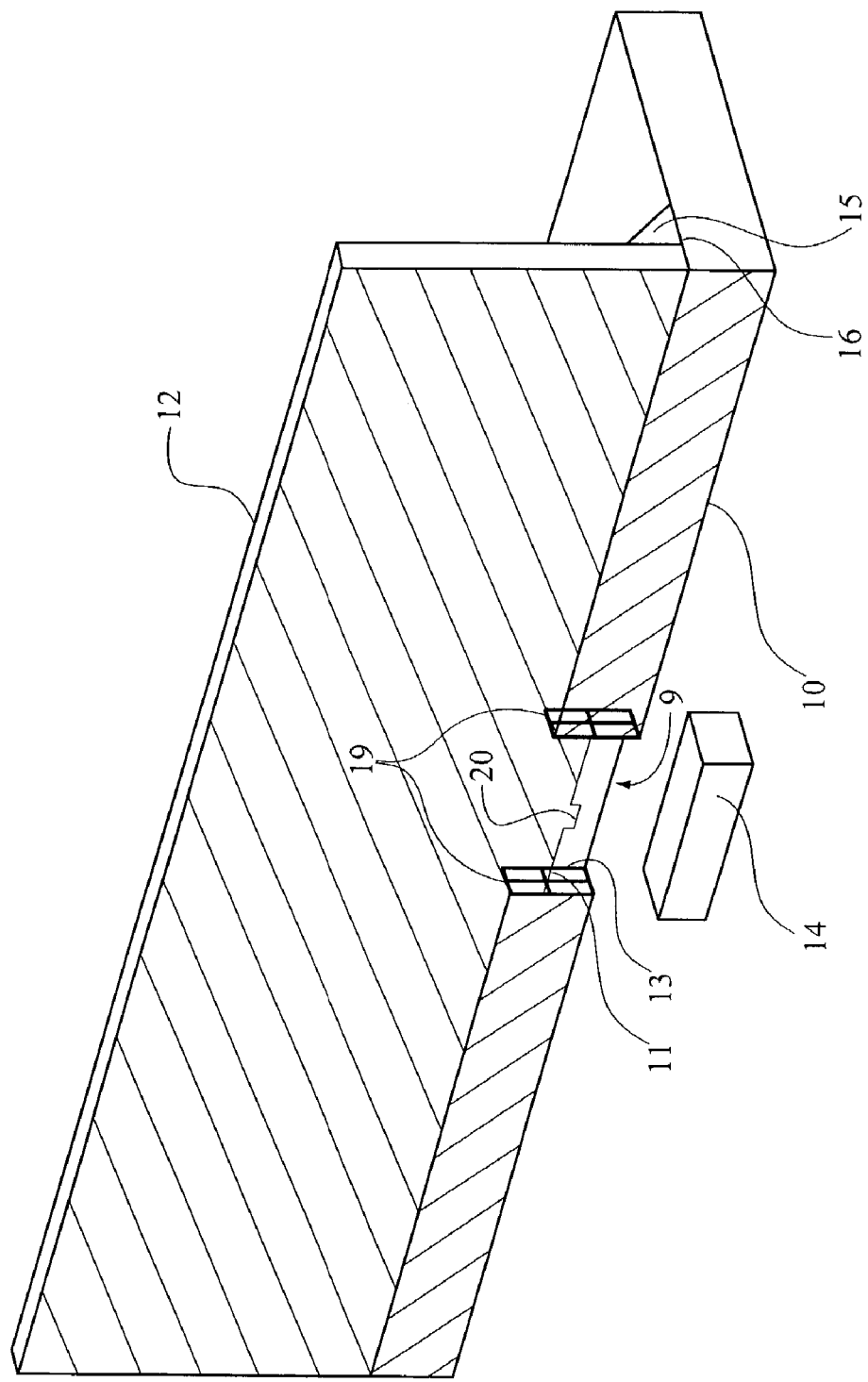
Figure 4:
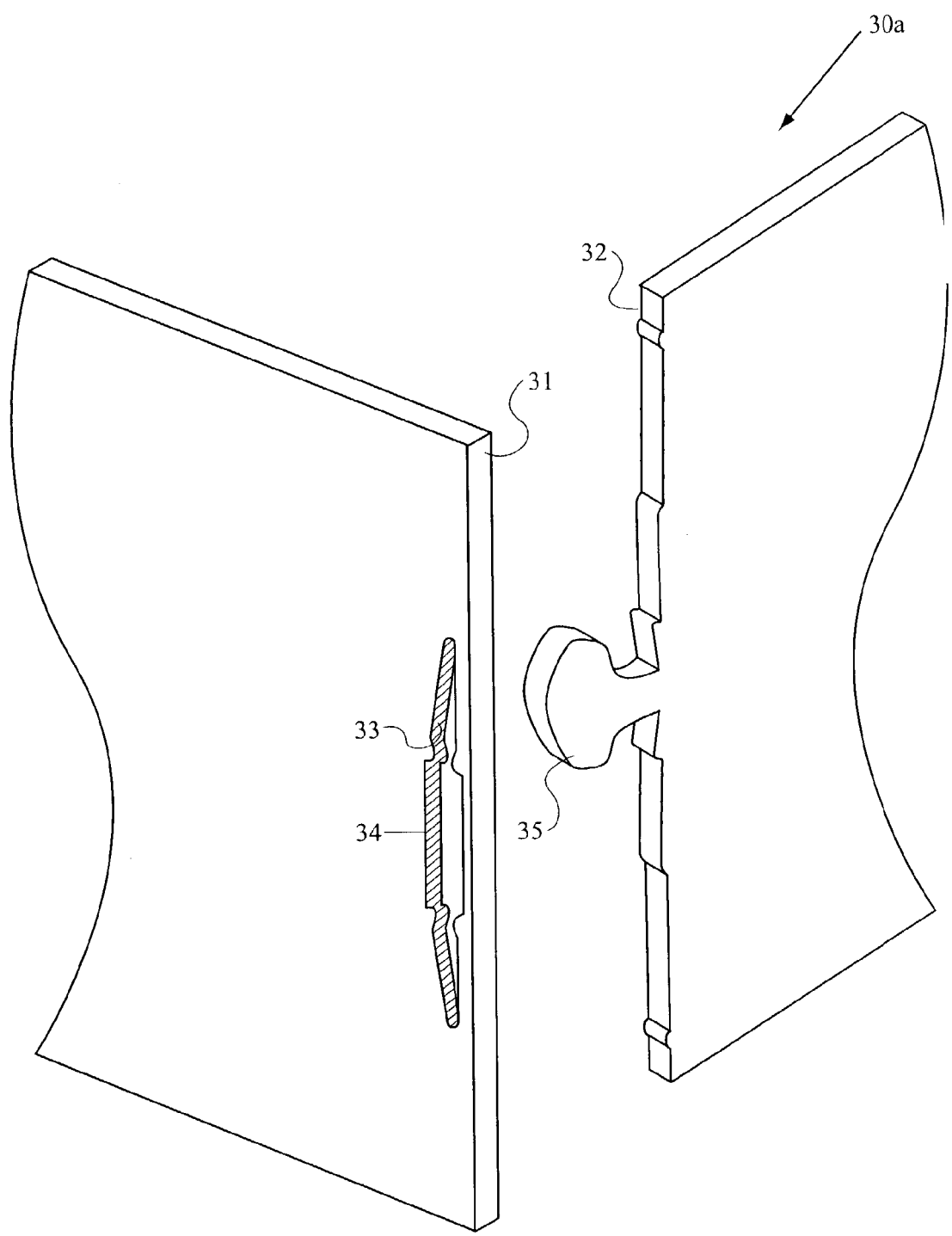
FIG. 4 is an isometric view of an unassembled fabrication assembly, according to the present invention.

Referring to FIG. 4, there is shown an isometric view of an unassembled fabrication assembly 30a, according to the present invention. Although the present invention will be discussed for an unassembled fabrication assembly 30a, an assembled fabrication assembly 30b, a locked fabrication assembly 30c, and a welded fabrication assembly 30c, it should be appreciated that each fabrication assembly 30a–d describes the same fabrication assembly 30 at different stages of manufacturing. The fabrication assembly 30a includes a first fabrication element 31 and a second fabrication element 32. The first fabrication element 31 includes a perimetric inner surface 33 that defines a slot 34, and the second fabrication element includes a tab 35. Although both fabrication elements 31 and 32 can be of various thicknesses, the thickness of the fabrication elements 31 and 32 are preferably metallic plates that allow the slot 34 and the tab 35 to be formed by a laser cutting machine. Moreover, the first fabrication element 31 includes a first base metal and the second fabrication element 32 includes a second base metal. It should be appreciated that the first base metal and the second base metal can include various types of metal.

Figure 5:
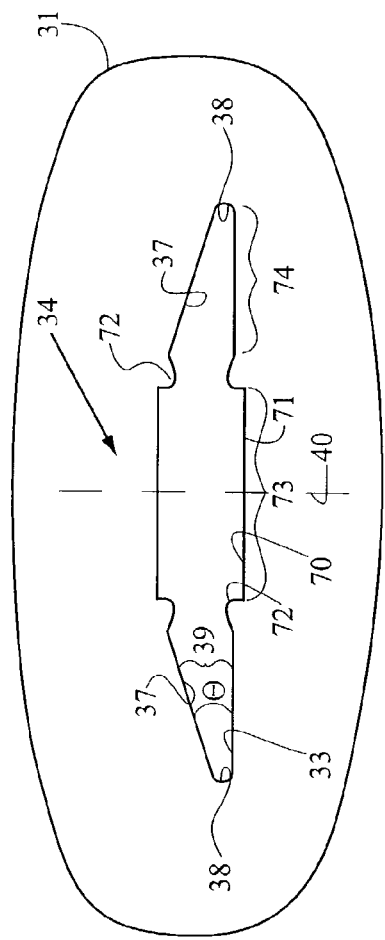
FIG. 5 is a top view of a slot defined by a first fabrication element of the fabrication assembly of FIG. 4.

Referring to FIG. 5, there is shown a top view of the slot 34 defined by the first fabrication element 31 of the fabrication assembly 30 shown in FIG. 4. The perimetric inner surface 33 defining the slot 34 includes portions that are oriented to one another at an angle different than 0° and 90°. In the illustrated example, the portions that are oriented to one another at the angle different than 0° and 90° are sides, or walls, comprising the perimetric inner surface 33. Thus, the slot 34 has a shape other than a square or a rectangle. Preferably, the perimetric inner surface 33 includes a center section 70 that is positioned between two tapered sections 37 that are equal in size. Although the two illustrated tapered sections 37 are preferred, it should be appreciated that the perimetric inner surface 33 could include only one tapered section or tapered sections being unequal in size. The perimetric inner surface 33 preferably includes a straight side 71 that extends through both tapered sections 37 and the center section 70. Each tapered section 37 preferably terminates in a rounded section 38. Although the rounded section 38 can vary in size, it should be appreciated that a radius of the rounded section 38 is preferably large enough that a tip of a welding gun can be positioned in the slot 34 adjacent to the rounded section 38 during welding. The tapered sections 37 also preferably include a width 39 that narrows as the distance from a centerline 40 of the slot 34 increases. In addition, the tapered sections 37 include an angle of taper ($\theta$) that can change as a matter of design choice. However, the present invention illustrates the angle as 15°. The center section 70 is preferably surrounded by four locating ledges 72 that engage and align the positioning of the tab 35 when the tab 35 is inserted into the slot 34 in a manner similar to the prior art. In the illustrated example, the center section 70 includes a length 73 that is a distance between center edges of the locating ledges 72 positioned along the illustrated x-axis. Each tapered section 37 also includes a length 74 being the distance from an outer edge of each locating ledge 72 included within the straight line 71 to the adjacent rounded section 38. The length 73 of the center section 70 is slightly greater than the length 74 of each tapered section 37.

Figure 6:
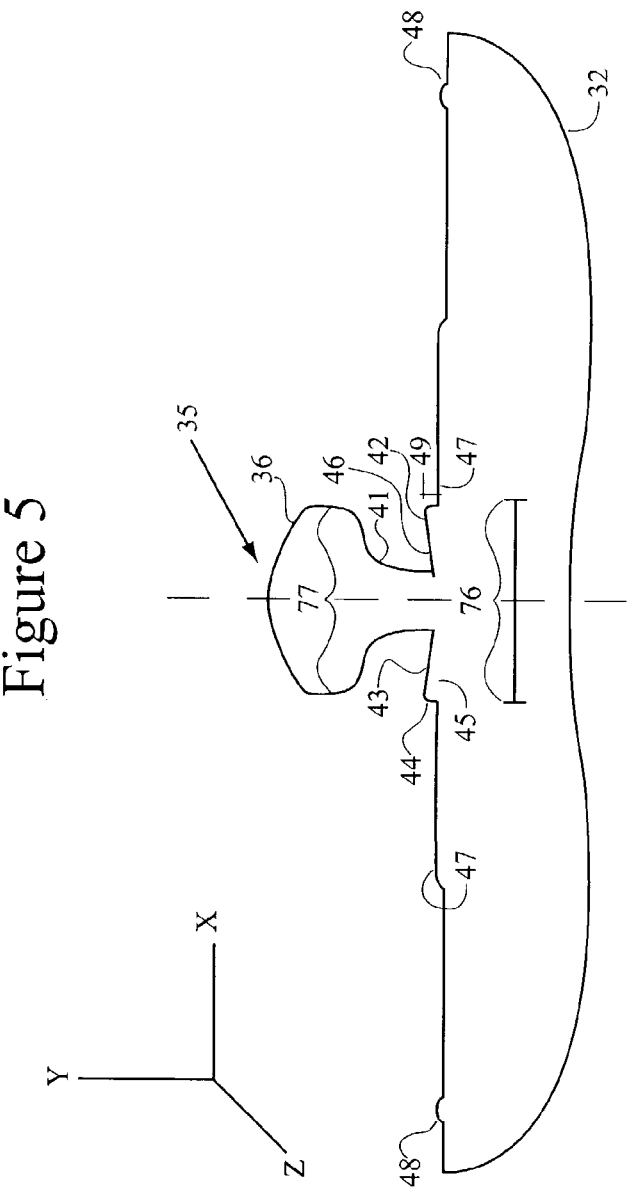
FIG. 6 is a side view of a tab included within a second fabrication element of the fabrication assembly of FIG. 4.

Referring to FIG. 6, there is shown a side view of the tab 35 included within the second fabrication element 32 of the fabrication assembly 30 shown in FIG. 4, according to the present invention. The tab 35 includes a breakable portion 36, a neck 41, and a shoulder 42. The shoulder 42 includes a top surface 43, a perimetric side surface 44, and a base 45. The perimetric side surface 44 includes portions that are oriented to one another at an angle other than 0° and 90°. Thus, the shoulder 42 is a shape other than a square or rectangle. Preferably, the shoulder 42 is free from sharp corners, meaning that the corners are noticeably rounded rather than including a right angle. The top surface 43 is irregular in shape, meaning that the top surface 43 is uneven. The top surface preferably includes a concave portion 46 from which the neck 41 protrudes. Thus, the top surface 43 slants downwards towards the neck 41. The perimetric side surface 44 preferably has a circumference adjacent to the base 45 that is greater than a circumference adjacent to the top surface 43. Thus, the perimetric side surface 44 slants at an angle towards the neck 41. The shoulder 42 includes a length 76 being a distance the base 45 extends between the perimetric side surface 44 and a height 49 being a distance between the base 45 and the top point of the top surface 43 along the illustrated y-axis. The breakable portion 36 includes a length 77 being the greatest distance along the illustrated x-axis between side surfaces of the breakable portion 36. The second fabrication element 32 preferably includes at least one spacer 47 and 48 on each side of the tab 35. Although the present invention contemplates various numbers and types of spacers 47 and 48, the present invention is illustrated as including at least one second shoulder 47 and at least one protrusions 48 used as the spacers on each side of the tab 35. Preferably, there are two second shoulders 47, one located on each side of the tab shoulder 42. The second shoulders 47 preferably extend from the tab shoulder 42 to the rounded section 38 of the slot 34.

Figure 7:
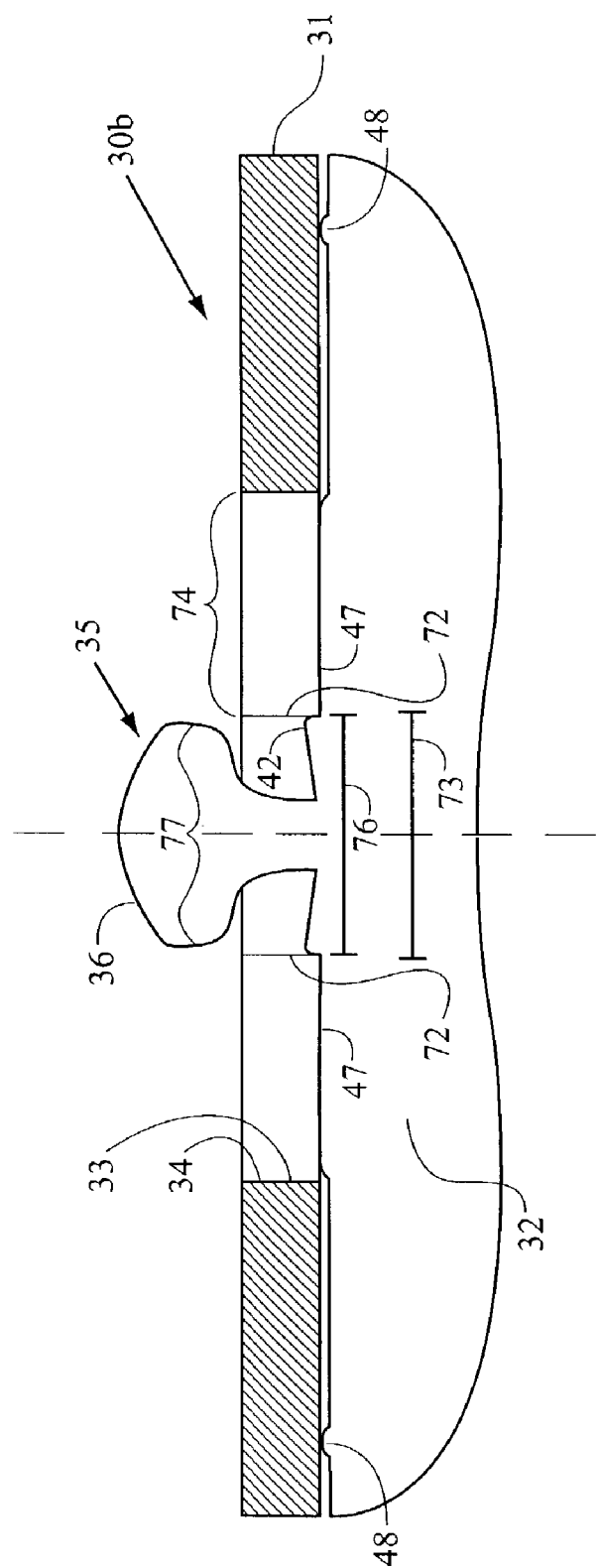
FIG. 7 is a sectioned side view of the tab of FIG. 6 inserted into the slot of FIG. 5 forming an unwelded fabrication assembly, according to the present invention.

Referring to FIG. 7, there is shown a sectioned side view of the tab 35 of FIG. 6 inserted in the slot 34 of FIG. 5 to form an unwelded fabrication assembly 30b, according to the present invention. It should be appreciated that the illustrated cross section is adjacent to the straight side 71 of the slot 34 and includes both the center section 70 and the tapered sections 37. However, the cross section will narrow as the distance from the straight side 71 increases until only the tab 35 within the center section 70 of the perimetric inner surface 33 is shown. The fabrication assembly 30b is assembled by inserting the tab 35 of the second fabrication element 32 into the slot 34 defined by the first fabrication element 31. The breakable portion 36 of the tab 35 protrudes through the slot 34, and can be any shape that will fit through the slot 34. Thus, the length 77 of the breakable portion 36 should not be greater than the length 73 of the center section 70 of the perimetric inner surface 33. Preferably, the length 73 of the center section 70 is only slightly larger than the length 76 of the shoulder 42. Thus, when the tab 35 is inserted into the slot 34, the locating ledges 72 make contact with the perimetric side surface 44 of the shoulder 42 in order to fix the physical orientation of the fabrication elements 31 and 32 to one another. Thus, the length 76 of the tab shoulder 42 is small enough to extend into the slot 34 while being large enough to provide a relatively fixed positioning and orientation attachment between the first fabrication element 31 and the second fabrication element 32, allowing for minimal relative movement. Further, the spacer protrusions 48 and the second shoulders 47 define, in part, a gap between the first fabrication element 31 and the second fabrication element 32. The second shoulders 47 do not extend into the slot 34 as does the tab shoulder 42, but rather fill the gap between the first fabrication element 31 and the second fabrication element 32. Similarly, the protrusions 48 are in contact with the first fabrication element 31 on each side of the tab 34 in order to maintain the gap between the elements 31 and 32 away from the tab 34.

Figure 8:
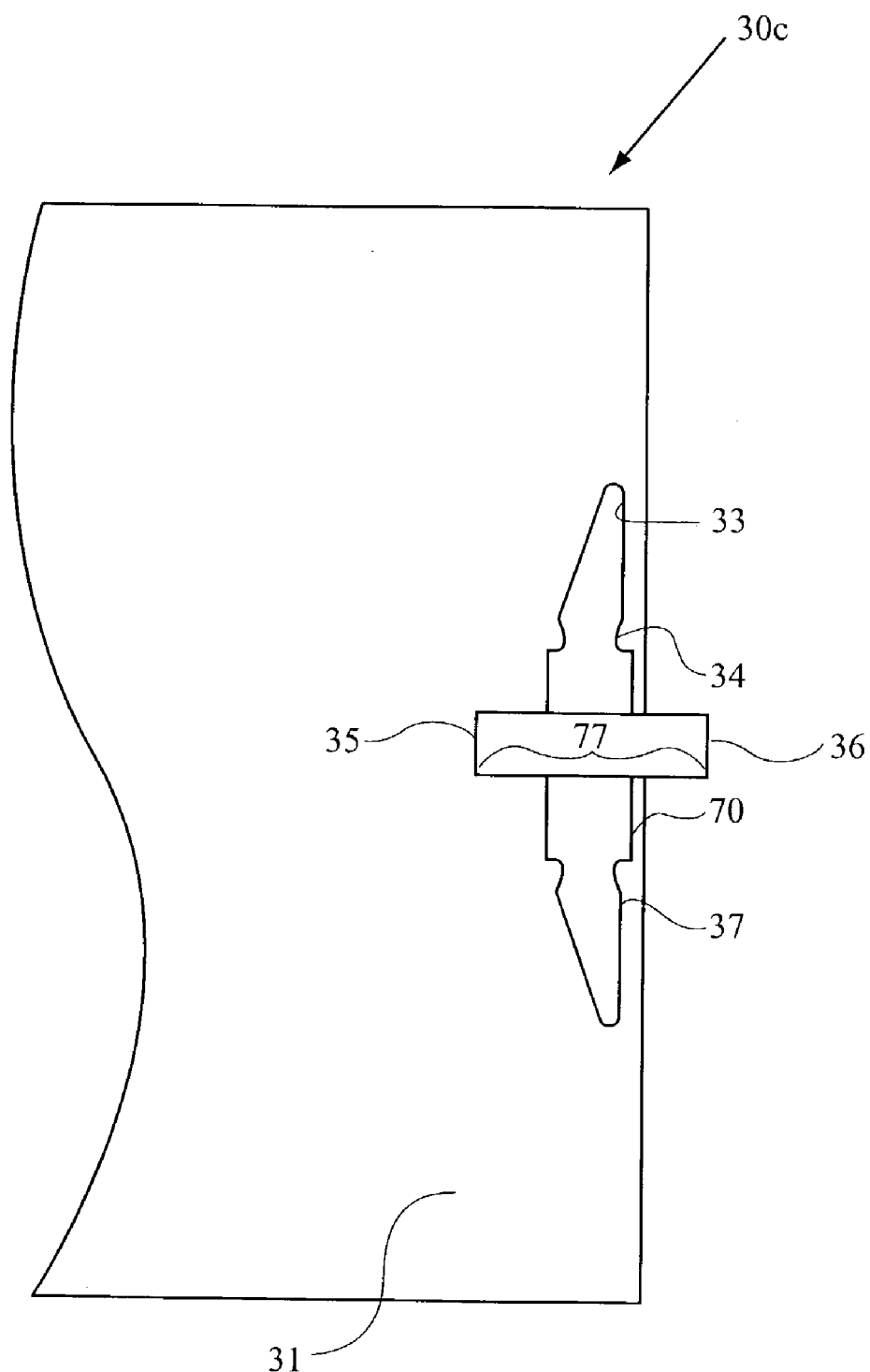
FIG. 8 is a front view of a locked fabrication assembly, according to the present invention.

Referring now to FIG. 8, there is shown a front view of a locked fabrication assembly 30c, according to the present invention. The tab 35 cooperates with the slot 34 to lock the first fabrication element 31 to the second fabrication element 32. The fabrication assembly 30 is locked by rotating the breakable portion 36 of the tab 35. In the illustrated example, the fabrication assembly 30c is locked when the breakable portion 36 is oriented approximately about 30°-60° with respect to the slot 34. Thus, the length 77 of the breakable portion 36 must be greater than a width of the center section 70 of the perimetric inner surface 33 of the slot 34. The present invention contemplates the breakable portion 15 being twisted in either direction in order to lock the fabrication assembly 30. When the breakable portion 36 is oriented perpendicularly to the slot 33, a relatively smooth, curved undersurface of the breakable portion 36 firmly engages the surface of the first fabrication element 31 in order to ensure that the first fabrication element 31 and the second fabrication element 32 are secured to one another.

Figure 9:
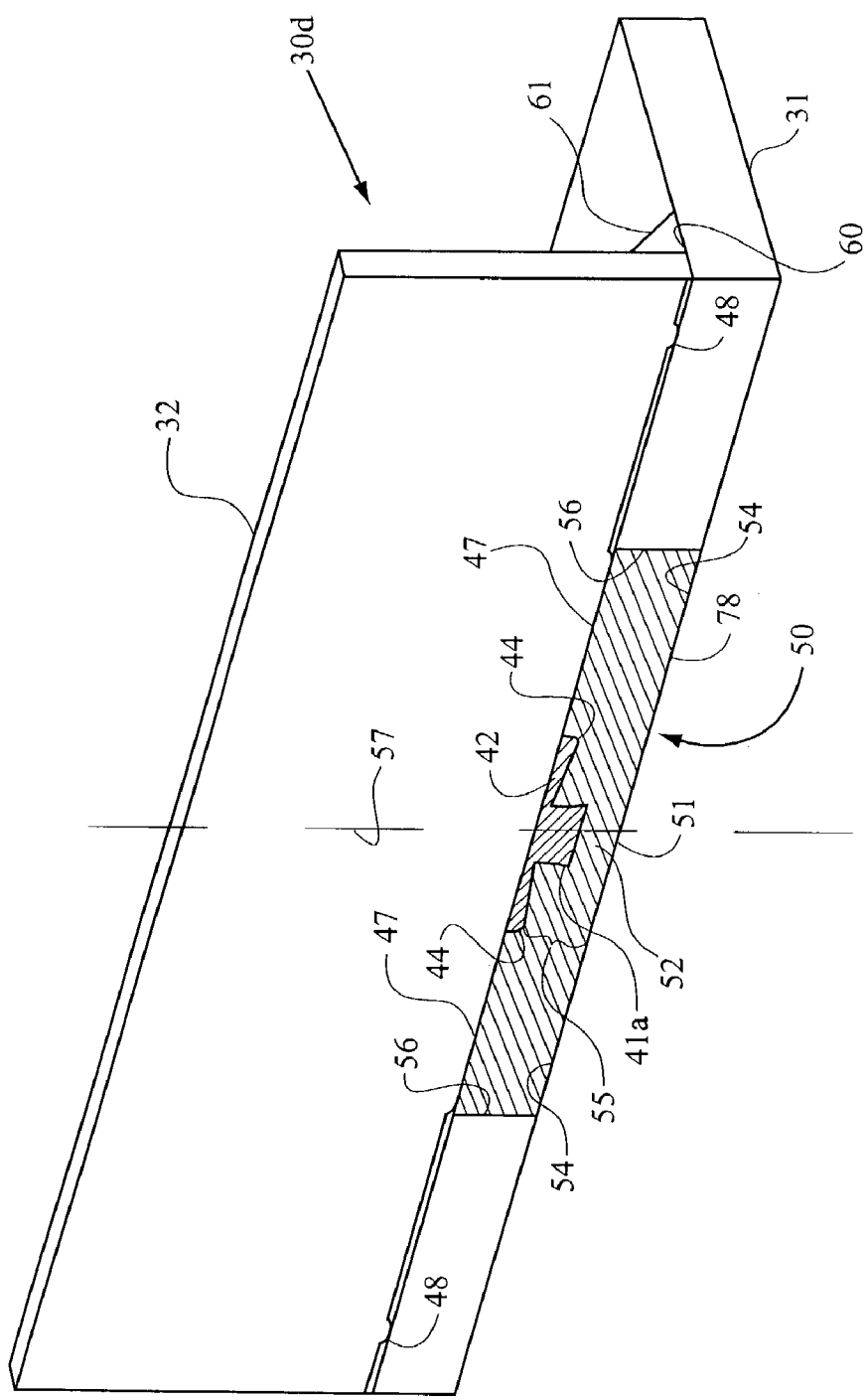
FIG. 9 is a sectioned side view of a welded joint included within a welded fabrication assembly, according to the present invention.

Referring to FIG. 9, there is shown a cross section of a welded joint 50 within the welded fabrication assembly 30d, according to the present invention. It should be appreciated that the welded fabrication assembly 30d is sectioned through the slot 34 adjacent to the straight side 71 of the perimetric inner surface 33. However, due to the tapered shape of the perimetric inner surface 33 defining the slot 34, the slot 34 within the cross section of the welded joint 50 will narrow with distance from the straight side 71. After the fabrication assembly 30 is locked as shown in FIG. 8, the breakable potion 36 of the tab 35 is removed from the tab 35, a plug weld 51 is welded into the slot 34, and a fillet weld 61 is welded along an interface 60 between the first fabrication element 31 and the second fabrication element 32. In order to remove the breakable portion 36, the breakable portion 36 is further rotated in the same direction in which it was rotated in order to the lock the fabrication assembly 30 as shown in FIG. 8. It should be appreciated that the angular displacement required to remove the breakable portion 36 may be greater than the angular displacement required to lock the fabrication assembly 30.

The welded fabrication assembly 30d includes a welded joint 50 that includes the plug weld 51. The plug weld 51, a severed portion 41a of the neck 41, and the shoulder 42 are positioned within the slot 33. The plug weld 51, the severed portion 41a of the neck 41, and the shoulder 42 preferably fill the slot 34. The plug weld 51 preferably includes a center portion 52 and two tapered portions 54. The center portion 52 and the tapered portions 54 are defined by the center section B70 and the tapered sections 37 of the perimetric inner surface 33, respectively. The center portion 52 of the plug weld 51 includes a depth 55 that is a distance from the top point of the top surface 43 and an outer edge 78 of the plug weld 51. The depth 55 of the center portion 52 is greater than the height 49 of the shoulder 42. In other words, the shoulder 42 preferably extends less than half way through the slot 34. It is preferred that the shoulder height 49 be relatively small while still being capable of making contact with the locating ledges 72 in order to fix the orientation of the fabrication elements 31 and 32 to one another. The center portion 52 of the plug weld 51 preferably can penetrate a space between the perimetric side surface 44 of the shoulder 42 and the locating ledges 72 to fuse the first base material of the locating ledges 72 and the second base material of the shoulder 42.

The welded joint 50 also includes the fillet weld 61 that is positioned along the interface 60 between the first fabrication element 31 and the second fabrication element 32. The spacers 47 and 48 define, in part, the penetration of the fillet weld 61. The larger the spacers 47 and 48, the greater the space at the interface 60 between the first and second fabrication elements 31 and 32. Because of the increased space between the first fabrication element 31 and the second fabrication element 32, the fillet weld 61 can penetrate deeper along the interface 60 without an increase in the heat being supplied to the weld. Because the fillet weld 61 is preferably made after the plug weld 51 and the second shoulders 47 extend from the tab shoulder 42 to the rounded section 38 of the slot 34, the penetration of the fillet weld 61 can be increased without concern over fillet weld material blowing into the slot 33. However, it should be appreciated that the size of the gap at the interface should be limited. If the size of the gap is too large, the fillet weld material may flow into the gap without fusing with the base materials of the plates. For instance, it has been found that a gap between 0.5–1.5 mm is preferred for plates having a thickness less than 12 mm.

INDUSTRIAL APPLICABILITY

Referring to FIGS. 4–9, the present invention will be descried for fabrication assemblies including fabrication elements 31 and 32 that are metal plates preferably oriented perpendicularly to one another. However, it should be appreciated that the thickness of the fabrication elements and the angular orientation of the fabrication elements to one another may vary. In order to join together the first fabrication element 31 and the second fabrication element 32, the slot 34 and the tab shoulder 42 are preferably shaped to include portions that are oriented at an angle different than 0° and 90°. In the illustrated example, the portions that are oriented at the angle different than 0° and 90° are the sides, or walls, of the perimetric inner surface 33 and the perimetric side surface 44. Thus, in the preferred embodiment, both the slot 34 and the tab shoulder 42 have a shape other than a square or a rectangle. However, the present invention contemplates only one of the slot 34 and tab shoulder 42 having a shape other than rectangle or a square. For instance, the present invention contemplates a fabrication assembly including a rectangular shaped slot, but with a tab shoulder having an uneven top surface and an angled side surface. Although there are various methods of shaping the perimetric inner surface 33 defining the slot 34 and the tab shoulder 42, the surfaces 33, 43 and 44 are preferably formed by the use of conventional methods of laser machining. Thus, the fabrication elements 31 and 32 preferably have a thickness suitable for laser machining. Laser machining allows the tab 35 and the slot 34 to be formed relatively efficiently and precisely.

Referring specifically to FIG. 5, the perimetric inner surface 33 defining the slot 34 is laser machined to include the center section 70 between the two tapered sections 37. In order to laser machine the slot 34, the first fabrication element 31 is generally oriented perpendicularly to the laser, and the laser machine is programmed to cut an outline of the shape illustrated in FIG. 5. The straight side 71 is included within both tapered sections 37 and the center section 70. The tapered sections 37 are laser machined to taper into rounded sections 38 as the distance from the centerline 40 increases. Further, the locating ledges 72 are laser machined between the center section 70 and the tapered sections 37. Although the present invention illustrates the perimetric inner surface 33 being laser machined to include the shape shown in FIG. 5, it should be appreciated that there are various shapes that could be laser machined and provide a gradual transition in geometry from the fillet weld 61 to the plug weld 51.

Referring specifically to FIG. 6, the tab 35 is preferably laser machined to include the breakable portion 36, the neck 42, and the shoulder 42. In order to laser machine the tab 35, the second fabrication element 32 is generally oriented perpendicularly to the laser, and the laser machine is programmed to cut an outline of the tab shape illustrated in FIG. 6. The breakable portion 36 can be machined to have various shapes as long as the length 77 of the breakable portion 36 is less than length 73 of the center section 70 of the perimetric inner surface 33 and greater than the width of the center section 70. The neck 41 is laser machined to connect the shoulder 42 to the breakable portion 36 and to be narrower than both the breakable portion 36 and the shoulder 42. The shoulder 42 is laser machined to include the concave portion 46 from which the neck 41 protrudes and the angled perimetric side surface 44. Although the present invention is illustrated the top surface 43 being angled along the illustrated x-axis, it should be appreciated that the top surface 43 could also be angled along the illustrated y-axis to further enhance penetration of the plug weld 51 between the shoulder 42 and the perimetric inner surface 33. However, due to limitations placed on the possible orientations of the laser to the fabrication element 32 during machining, the laser may not be capable, without additional expense, of machining the top surface 43 to also be angled along the illustrated y-axis. Thus, in order for the top surface 43 to be angled along both the x-axis and the y-axis, the shoulder 44 may be shaped by a method different than laser machining. The shoulder 42 preferably is free from sharp corners, and is less than half the height of the perimetric inner surface 33. Although the tab 35 preferably is laser machined to include the shape shown in FIG. 6, it should be appreciated that the tab 35 can be laser machined to include various shapes that can increase the penetration of the plug weld 51.

Referring to FIG. 7, once the perimetric inner surface 33 defining the slot 34 and tab 35 are formed, the fabrication assembly 30 can be assembled by inserting the tab 35 of the second fabrication element 32 into the slot 34 of the second fabrication element 32. The sizing of the shoulder 42 and the slot 34 are such that there is a close fit between the shoulder 42 and the slot 34 when the breakable portion 36 of the tab 35 protrudes through the slot 34. More specifically, a portion of the perimetric side surface 44 of the shoulder 42 will be contacting the locating ledges 72 of the inner perimetric surface 33 in order to fix the orientation of the fabrication elements 31 and 32 to one another. Referring to FIG. 8, in order to lock the fabrication assembly 30 so that the orientation of the fabrication elements 31 and 32 to one another can be secured during welding, the breakable portion 36 is rotated. It should be appreciated that a tool, such as a wrench, may be required to rotate the breakable portion 36. Because the length 77 of the breakable portion 36 is greater than the width of the center section 70, when the breakable portion 36 is approximately perpendicular to the slot 34, the breakable portion 36 locks the first fabrication element 31 to the second fabrication element 32.

Referring to FIG. 9, after the fabrication assembly 30 is assembled and the orientation of the fabrication elements 31 and 32 to one another is locked, the breakable portion 36 can be removed from the tab 35 and the slot 33 can be plug welded. The breakable portion 36 of the tab 35 is removed by further rotating the breakable portion 36 back and forth, or possibly in the same direction the breakable portion 36 was rotated in order to lock the fabrication assembly 30. In order to rotate the breakable portion 36, a tool, such as a wrench, may be required. The angular displacement to remove the breakable portion 36 from the tab 35 may be greater than the angular displacement required to lock the fabrication assembly 30. It should be appreciated the neck 41 will include a failure point that is sufficiently narrow that that when the breakable portion 36 is further rotated, the tab 35 will sever the neck 41 at the failure point within the slot 33. The failure point will generally be the most narrow portion of the neck 41 and is a matter of design choice, but preferably is as close to the shoulder 42 as possible in order to avoid unfused areas between the neck 41 and the plug weld 51.

Still referring to FIG. 9, once the breakable portion 36 has been removed from the tab 35, the severed portion 41a of the neck 41 and the shoulder 42 remain within the slot 34. The slot 34 is then filled with the plug weld 51 in a conventional manner. The plug weld 51 can strengthen the attachment of the fabrication elements 31 and 32, provide a smooth surface where the slot 34 was, and eliminate voids within the slot 34. Because the rounded sections 38 preferably have a radius larger than the tip of a conventional welding gun, when plug welding, the tip of the welding gun, including a welding wire, can be positioned within the rounded section 38 of the tapered section 37 of the perimetric inner surface 33. Thus, the plug weld 51 can fill the portion of the slot 34 defined by the tapered sections 37 of the perimetric inner surface 33. Further, because the shoulder 42 is lasered to be relatively small, over half of the slot 34 defined by the center section 70 will be a void that the plug weld 51 can penetrate. During the plug welding, the concave portion 46 of the top surface 43 of the shoulder 42 without sharp corners permits better fusion and a less abrupt transition between the second base metal comprising the shoulder 42 and the welding material. Moreover, the angled perimetric side surface 44 aids in the penetration of welding material between the shoulder 42 and the locating ledges 72 in order to fuse the area between the shoulder 42 and the perimetric inner surface 33. Preferably, the slot 34 is completely filled with the plug weld 51, and the plug weld material is fused with the second base material of the tab 35 and the first base material of the locating ledges 72, leaving no unfused areas or voids that can become initiation points for fatigue cracks.

Once the slot 33 is filled with the plug weld 51, the fabrication assembly 30 is preferably welded with the fillet weld 61. Those skilled in the art will appreciate that it is preferred to fill the slot 33 with the plug weld 51 prior to fillet welding in order to avoid the fillet weld material from blowing into the slot 33. Thus, the slot 33 can be protected by the plug weld 51 from increased penetration of the fillet weld 61 into the space between the first fabrication element 31 and the second fabrication element 32. However, it should be appreciated that the present invention contemplates the fillet weld 61 could be made prior to the plug weld 51. Because the second shoulders 47 extend the length of the slot 34, the second shoulders 47 can also protect the slot 34 from the increased penetration of the fillet weld 61 by, at least partially, separating the slot 34 from the fillet weld 61. The fillet weld 61 is made along the interface 60 between the fabrication elements 31 and 32, and adjacent to the straight side 71 of the perimetric inner surface 33 defining the slot 34. Although in the illustrated example there is only one fillet weld 61, it should be appreciated that, if the first fabrication element is joined to the second fabrication element in a middle portion of the second fabrication element, two fillet welds, one on each side of the interface between the two fabrication elements could be used. If two fillet welds are used, the geometry of the slot 34 may change in order to provide a gradual transition from each fillet weld to the plug weld.

The penetration of the fillet weld 61 is, in part, defined by the size of the spacers 47 and 48. Although the gap has a tendency to close as the fillet weld is being made, the protrusions 48 will maintain the gap on each side of the tab 35. The larger the spacers 47 and 48, the larger the space between the first fabrication element 31 and the second fabrication element 32 along the interface 60, and thus, the deeper the fillet weld 61 can penetrate into the interface without increasing the heat used in the welding process. It is beneficial to use less heat in the welding process in order to reduce distortion and residual stress in the weld, reduce metallurgical change to the base metal and reduce energy consumption. The deeper the fillet weld 61 penetrates the interface 60, the less unfused area between the first fabrication element 31 and the second fabrication element 32 that can create small cracks within the welded joint 50. Thus, when subjected to repeated loads, there are less small voids to act as initiation points for fatigue cracks that can extend through the fabrication assembly 30. The fact that the fabrication elements 31 and 32 are preferably laser machined allows the gap between the elements 31 and 32 to be accurately controlled. After the interface 60 is fillet welded, the outer edge of the plug weld 51 can be grounded to blend with the rest of the fabrication assembly 30.

Once the fabrication assembly 30 is completely manufactured, the fabrication assembly 30 may be included within an article, such as a vehicle frame. If the fabrication assembly 30 is included within an area of the article that is subjected to repeated loads, the fabrication assembly 30 can be subjected to relatively high stress. The stress caused by the load can be distributed through the fabrication assembly 30 of the present invention rather than concentrated within a certain area. For instance, the stress caused by the load can gradually transition from the fillet weld 61 to the plug weld 51 due to the gradual change in geometry from the fillet weld 61 to the plug weld 51. It is known in the art that stress can concentrate in and around abrupt changes in geometry. Therefore, rather than the plug weld 51 including sharp corners in which stress can concentrate, the plug weld 51 defined by the perimetric inner surface 33 includes the rounded sections 38. From the rounded sections 38, the perimetric inner surface 33, and thus the plug weld 51, angles towards the centerline 40. Thus, the change in stiffness of the relatively long, narrow fillet weld 61 gradually transitions to the stiffness of the relatively short and wide plug weld 51 which reduces stress concentrations within and around the plug weld 51. With a reduced amount of stress concentrated within and around the plug weld 51, the assembly can be more resistant to fatigue related problems.

The present invention is advantageous because it provides a slot and tab welded joint 51 that can withstand high stress applications. Thus, the advantage of slot and tab welded joints, being reduced cost and ease of manufacturing without the use of fixtures, can be extended to fabrication assemblies used in higher stress applications. The present invention exploits the geometry of the slot 34 and/or tab 35 in order to more evenly distribute the stress placed on the welded joint 50 and to avoid areas of stress concentration and/or voids that can eventually lead to fatigue cracks. The geometry of the slot 34 is used to decrease stress concentration within the plug weld 51. By including the tapered sections 37 and the rounded sections 38 into the perimetric inner surface 33 defining the slot 34, the transition in stiffness between the fillet weld 61 and the plug weld 51 is gradual, thereby reducing stress concentration within and around the plug weld 51.

Further, the present invention uses the geometry of the tab shoulder 42 to reduce the unfused areas that create small voids within and around the plug weld 51. The geometry of the tab shoulder 42 allows for increased penetration of the plug weld 51 and increased fusion between the welding material and the second base material of the shoulder 42. Specifically, the shoulder 42 and the locating ledges 72 of the perimetric inner surface 33 defining the slot 34 are kept small so that they can be fused during welding in order to prevent any unfused area between the shoulder 42 and the perimetric inner surface 33. The relatively small size of the shoulder 42 will also increase the penetration of the plug weld 51. In addition, the perimetric side surface 44 of the shoulder 42 slants away from the perimetric inner surface 33 defining the slot 34 in order to reduce unfused areas between the shoulder 42 and the perimetric inner surface 33. Thus, a crack plane that could form perpendicularly to the fillet weld 61 due to unfused areas between the perimetric inner surface 33 and the perimetric side surface 44 can be reduced, and possibly eliminated. Moreover, the top surface 43 of the shoulder 42 is angled and without sharp corners in order to promote fusion between the plug weld material and the second base material of the shoulder 42. The less unfused areas, the less initiation points for fatigue cracks.

In addition, the present invention is advantageous because it reduces the unfused area along the interface 60 by controlling the size of the space between the first fabrication element 31 and the second fabrication element 32. The spacers 47 and 48 define the space between the first fabrication element 31 and the second fabrication element 32 along the interface 60. The controlled space between the fabrication elements 31 and 32 allows the fillet weld 61 deeper penetration into the interface 60 without increasing the heat supplied to the weld. The increased fillet weld 61 penetration decreases the unfused area along the interface 60 parallel to the fillet weld 61 along the length of the shoulder 42 and the perimetric inner surface 33. Thus, the reduced unfused surfaces results in reduced stress concentrators that act as initiation sites for fatigue cracks.

Overall, the fatigue resistance of the slot and tab joint is increased by altering the geometry of slot 34, the geometry of the tab 35, and including spacers 47 and 48 between the fabrication elements 31 and 32. Although it is preferred that the fabrication assembly 30 includes the altered slot geometry, the altered tab geometry, and the spacers 47 and 48, it should be appreciated that the present invention contemplates a fabrication assembly including less than all of these aspects as long as the slot or tab has a shape other than a rectangle or square. Because the slot and tab joint is fatigue resistant, the slot and tab method of joining fabrication elements can be used in higher stress applications, thereby, reducing costs associated with fixtures. In fact, the fatigue resistant slot and tab design of the present invention has been found to have increased the life of the welded joint used in relatively high stress applications by as much as 100%, or more.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A fabrication assembly comprising:
a first fabrication element including a perimetric inner surface defining a slot with a center section and at least one tapered section;
a second fabrication element including a tab that includes a breakable portion, a neck, and a shoulder, and the shoulder including a top surface, a perimetric side surface, and a base; and
the shoulder being received in the center section but not the at least one tapered section, and the tab being cooperative with the slot to lock the first fabrication element to the second fabrication element.

2. The fabrication assembly of claim 1 wherein the perimetric side surface adjacent to the base includes a circumference greater than the a circumference of the perimetric side surface adjacent to the top surface.

3. The fabrication assembly of claim 1 wherein the at least one tapered section terminating in a rounded section; and
the at least one tapered section includes a width that narrows with increasing distance from the shoulder.

4. The fabrication assembly of claim 1 wherein at least one of the first fabrication element and the second fabrication element includes at least one spacer in contact with an other of the first fabrication element and the second fabrication element.

5. The fabrication assembly of claim 1 wherein the shoulder being free of sharp corners.

6. The fabrication assembly of claim 1 wherein the shoulder includes a height being less than half a height of the perimetric inner surface.

7. The fabrication assembly of claim 2 wherein the top surface of the shoulder being irregular in shape and including a concave portion from which the neck protrudes;
the at least one tapered section terminating in a rounded section, and including a width that narrows with increasing distance from the shoulder;
at least one of the first fabrication element and the second fabrication element includes at least one spacer in contact with an other of the first fabrication element and the second fabrication element; and
the shoulder being free from sharp corners and including a height being less than half a height of the perimetric inner surface.

8. A welded joint comprising:
a first fabrication element including a perimetric inner surface defining a slot with a center section and at least one tapered section;
a second fabrication element including a severed tab that includes a severed neck and a shoulder, and the shoulder including a top surface, a perimetric side surface and a base;
at least a portion of the severed neck and shoulder being positioned within the center section of the slot but not the at least one tapered section, and the plug weld extending into the at least one tapered section; and
a fillet weld being positioned along an interface between the first fabrication element and the second fabrication element.

9. The welded joint of claim 8 wherein the slot being filled with the plug weld and the portion of the severed neck and the shoulder.

10. The welded joint of 9 wherein the plug weld includes a center portion and at least one tapered portion;
the center portion includes a depth that is greater than a height of the shoulder, and fills a gap between the perimetric side surface and the perimetric inner surface; and
the at least one tapered portion terminating at a rounded portion, and including a width that narrows as a distance from a center of the plug weld increases.

11. The welded joint of claim 10 including at least one spacer defining, at least in part, a penetration of the fillet weld.

12. The welded joint of claim 11 wherein the shoulder being free from sharp corners; and
the top surface being an irregular shape.

13. The fabrication assembly of claim 7 wherein the at least one tapered section includes first and second tapered sections located on opposite sides of the center section.

14. The welded joint of claim 8 wherein the at least one tapered section includes first and second tapered sections located on opposite sides of the center section.

* * * * *